(12) United States Patent
Carlson et al.

(10) Patent No.: US 7,965,930 B2
(45) Date of Patent: Jun. 21, 2011

(54) FLEXIBLE TUBING WITH IMBEDDED HELICAL CONDUCTORS AND METHOD OF MAKING

(76) Inventors: Eric Carlson, Laguna Hills, CA (US); Lennart Carlson, Laguna Hills, CA (US)

(*) Notice: Subject to any disclaimer, the term of this patent is extended or adjusted under 35 U.S.C. 154(b) by 899 days.

(21) Appl. No.: 11/903,898

(22) Filed: Sep. 25, 2007

(65) Prior Publication Data
US 2009/0078440 A1 Mar. 26, 2009

(51) Int. Cl.
*F24H 1/10* (2006.01)
*F16K 49/00* (2006.01)
(52) U.S. Cl. ........................................ 392/478; 137/341
(58) Field of Classification Search .......... 392/465–496; 137/341; 138/33; 219/547; 222/146.1
See application file for complete search history.

(56) References Cited

U.S. PATENT DOCUMENTS
5,848,223 A * 12/1998 Carlson ......................... 392/478
* cited by examiner

*Primary Examiner* — Daniel Robinson
(74) *Attorney, Agent, or Firm* — Terry L. Miller

(57) ABSTRACT

A smooth-bore plastic tubing with helical support bead is resistant to collapse and incorporates plural electrical conductors outside of the tubing bore and insulated from ambient, and from one another. The conductors may have a desired relatively high thermal conductivity to tidal air flow within the tubing, while also having a comparatively high thermal resistance to ambient. A method for making the tubing includes extruding a molten thermoplastic ribbon with an elevated plateau portion defining plural conductor-receiving grooves. The plastic ribbon is wrapped to form a tube and plural conductors are embedded in the grooves of the plateau portion. A molten thermoplastic bead is then applied atop the plateau portion providing a smooth-bore unitary flexible tubing structure with both inside and outside surfaces which are substantially free of crevices or recesses which could retain soil or bacteria.

17 Claims, 1 Drawing Sheet

FLEXIBLE TUBING WITH IMBEDDED HELICAL CONDUCTORS AND METHOD OF MAKING

BACKGROUND OF THE INVENTION

1. Field of the Invention

The present invention relates generally to collapse-resistant, flexible thermoplastic tubing, to such plastic tubing which includes plural helical conductors extending along the length of the tubing, and to a method for making such flexible plastic tubing.

2. Description of Conventional Technology

Tubing having a relatively thin wall and an integral helical supporting bead is known in the art. Such support-bead tubing construction provides substantial crush resistance while leaving the tube wall flexible enough to permit short-radius bends without collapsing or kinking the tube. The versatility of this kind of tubing is evidenced by its wide applicability in construction, ventilation, manufacturing processes, auto washes, hospitals, medical devices, and other fields. In medical applications the necessity to maintain a clean environment dictates that the tubing be free of crevices inside or outside in which soil or bacterial contamination could reside. A smooth inner bore for the tubing is also important because flow resistance must be kept to a minimum when a tidal air flow is conducted through the tubing, as is the case with inhalation therapy and other breathing-assistance machines.

U.S. Pat. No. 3,910,808 to Steward, assigned to the same assignee as this application, discloses apparatus for forming such thin-walled, flexible, crush resistant support-bead tubing.

Steward discloses means for extruding a plastic strip having a longitudinal rib, and winding means for helically winding the strip about an axis to produce a corrugated flexible tubing having a smooth bore.

Further, U.S. Pat. No. 5,454,061, also to Steward, discloses apparatus for forming such thin-walled, flexible, crush resistant support-bead tubing also including a helically disposed conductor. Steward '061 discloses a tubing in which the conductor is disposed adjacent to overlapping side edges of an extruded plastic strip or ribbon, which is wrapped helically on itself while molten to form the tubing wall. The overlapped edges of the ribbon as well as the conductor are then helically covered with an extruded molten bead, which also bonds with and becomes an integral part of the tubing.

With the Steward '061 tubing, and with other conventional tubing, when plural conductors are disposed in the tubing wall, they are immediately adjacent to one another. In some applications when the conductors are used for warming, heating, or maintaining the temperature of a tidal air flow in the tubing by means of resistance heating, for example, the heating from these conductors is concentrated at their location. It may be desirable for the conductors to not be immediately adjacent to one another so that heating is somewhat more dispersed. Further, when plural conductors are disposed in such a tubing wall, and one or more of the conductors is utilized for conducting instrumentation or telemetry signals, then it is also desirable for the conductors to be spaced apart a controlled and determined distance for purposes of preserving signal clarity and fidelity, for insuring electrical insulation between the conductors, and for preventing or reducing mutual inductive coupling among the heating and among the signal conductors.

No prior product, method of manufacture, or apparatus is known which provides a thin-walled, smooth-bore tube having plural spaced apart conductors helically imbedded in the outer structure of the tube and which conductors are available for heating of tidal air flow in the tube, as well as for instrumentation or telemetry signals to be conducted along the length of the tube, for example, all with a helically ribbed but substantially crevice-free outer surface.

SUMMARY OF THE INVENTION

In view of the deficiencies of the related art as discussed above, it is a primary object of the present invention to provide a flexible, lightweight, crush-resistant tubing having plural spaced apart conductors, and a conductor-supporting bead, helically wound about and integral with the wall of the tubing.

It is another object of this invention to provide such a tubing in which the wall of the tubing provides an elevated helical plateau, in which plural helical grooves or crevices are defined, and into which the plural conductors are disposed and spaced uniformly and helically about and along the length of the tubing, to there be integrally covered by a support bead.

These and other objects are achieved by the present invention which provides: a thin-walled, flexible and collapse-resistant plastic tubing having a substantially smooth bore and a helical outer support bead, the tubing including plural electrical conductors helically disposed within the wall of the tubing and beneath the support bead, the tubing comprising: a flexible tubing wall formed of elongate thermoplastic ribbon having opposite side edges, the thermoplastic ribbon including an elongate fine-dimension portion and a comparatively thickened elongate plateau portion, the plateau portion defining plural elongate fine-dimension grooves, the ribbon while molten being helically wrapped on itself to overlap the opposite side edges a certain amount forming a helical lap joint whereat opposite side edge portions of the ribbon heat-bond integrally to one another so that an elongate tubular body is formed; plural elongate electrical conductors each disposed one in a respective one of the fine-dimension grooves of the plateau portion and helically around and along the elongate tubular body; and an elongate thermoplastic support bead disposed helically around and along the elongate tubular body atop of both the plateau portion and the electrical conductors, while molten the support bead integrally heat-bonding to the tubing wall to form a unitary thin-walled tubing structure with helical outer support bead and embedded electrical conductors, whereby, the embedded electrical conductors are spaced from one another within the plateau portion, and are thermally insulated from ambient by the support bead.

While other heat-bondable plastics may be used successfully in the practice of this invention, for a variety of medical applications a polyester elastomer such as HYTRE™ 5556 is usable because of its properties including chemical purity, reusability, transparency and resistance to damage from sanitization. Thermoplastic rubbers such as SANTOPRENE® or thermoplastic elastomers such as SARLINK® are also suitable materials for forming a molten extruded ribbon which is wrapped onto itself and integrally bonds to form the tubing wall. The bead material is chosen for its ability to heat-bond with the flat ribbon forming the tubing wall, and may be of the same composition as the ribbon or of a suitable different composition which is compatible with the ribbon. For heating purposes, the wire conductor is preferably formed of copper, although resistive metal such as nickel-chromium may also be utilized. For telemetry purposes, the conductor(s) may be any suitable conductive material, including metals and conductive polymers, for example. A conductor which conducts light may also be employed (i.e., a fiber optic conductor).

Further applications of the present invention will be apparent to those skilled in the art from a consideration of a fully detailed exemplary embodiment thereof. To aid in the explanation of the exemplary embodiment, reference will be made to the figures of the appended sheets of drawings, which figures will first be described briefly.

BRIEF DESCRIPTION OF THE DRAWING FIGURES

The advantages and features of the present invention will be better understood by the following description when considered in conjunction with the accompanying drawings in which:

FIG. 1 provides an exterior view of a tubing according to this invention;

FIG. 2 is a fragmentary cross sectional view of the tubing seen in FIG. 1;

FIG. 3 provides a fragmentary cross sectional view of an elongate section of the wall of the tubing seen in FIGS. 1 and 2 during manufacture;

DETAILED DESCRIPTION OF AN EXEMPLARY PREFERRED EMBODIMENT OF THE INVENTION

Those ordinarily skilled in the pertinent arts and familiar with U.S. Pat. No. 3,910,808 to Steward will understand that tubing of the type described in this application is generally manufactured using an apparatus including a winding or wrapping head having plural (usually 4) cantilevered and rotationally driven winding rolls. These winding rolls are canted and spaced about a longitudinal axis for winding and rotationally advancing a helically wound and ribbed flexible tubing. The rolls rotate in unison while a molten plastic ribbon is helically wrapped on itself and integrally heat bonds to form the tubing wall, conductors are placed on this tubing wall, and an outer molten bead is wrapped helically along the tubing wall atop of the conductors. The bead integrally heat bonds to become a part of the tubing wall. The tubing is cooled in a water bath, and is then cut into determined lengths.

Figure 1:
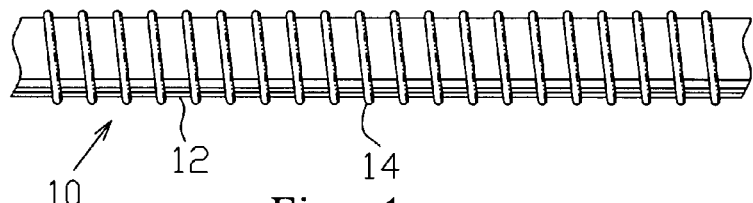

Viewing now FIG. 1, it is seen that the tubing 10 according to this invention has an exterior appearance essentially the same as conventional tubing of this type. That is, the tubing has a wall 12, and a helical bead 14 protruding somewhat above this wall and extending along the length of the tubing.

Figure 2:
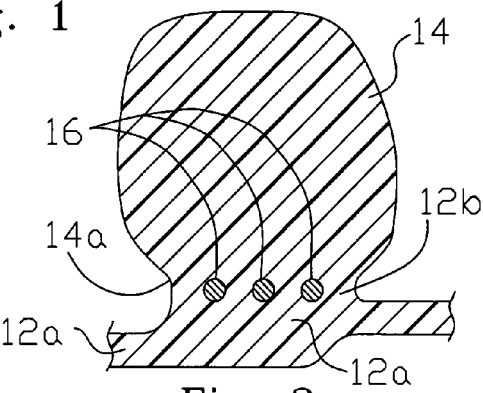

Viewing FIG. 2, however, it is seen that the wall 12 includes a rather thin and flexible portion 12*a* extending between adjacent beads 14, and a somewhat thickened plateau portion 12*b*. That is, the plateau portion 12*b* protrudes radially outwardly. Further, the bead 14 resides atop of this plateau portion 12*b* so that the bead 14 is elevated at its base 14*a* radially outwardly of the wall 12 of the tubing. Within the plateau portion the tubing includes plural spaced apart conductors 16. These conductors may be made of metal, so that they will conduct electricity. Alternatively, one or all of the conductors may be made of glass (i.e., a fiber optic conductor) so that it will conduct optical signals. Thus, the conductors 16 may be used for electrical resistance heating, for electrical signal conduction (i.e., for instrumentation or telemetry signals) or for optical signals.

In a method of making such a tubing according to this present invention (viewing now FIGS. 3-5), a first extrudate in the form of a molten heat-bondable ribbon 22 is extruded having a leading edge 24 and trailing edge 26 and a thickened ribbed (or grooved) plateau portion 28 defining plural grooves 28*a*. Also extruded is a molten heat-bondable bead 32. Although the extruders which provide these extrudates 22 and 32 may be physically separate components or machines, it is also possible to provide both extrudates using a single extruder. That is, for ease of explanation in FIGS. 3 and 5, it should be understood that both the ribbon 22 and bead 32 may be extruded from extrusion dies receiving molten plastic from a single extruder.

Figure 3:
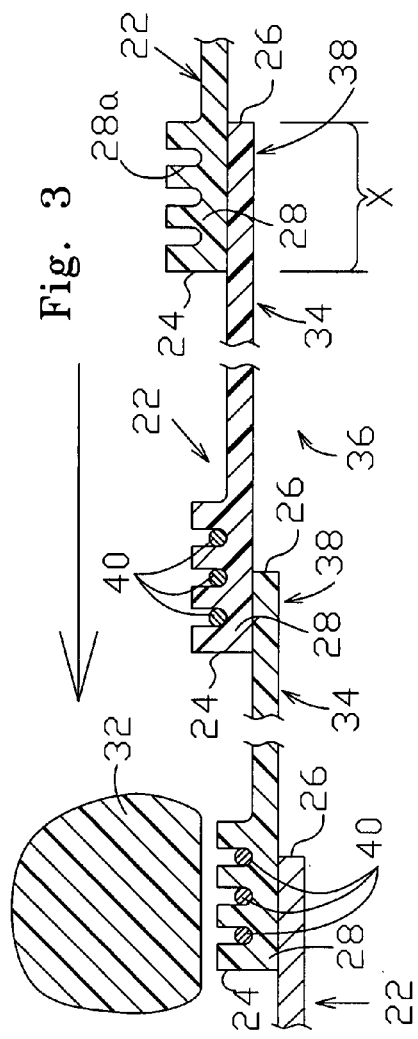

Considering FIG. 3, it will be appreciated that ribbon 22 is wrapped about canted and rotating rolls (not seen in the drawing Figure) and is advanced helically toward the left (as is indicated by the arrow on FIG. 3) so that it encircles the rolls and wraps upon itself with a certain overlap "X", as seen in FIG. 3. The molten ribbon 22 heat bonds to itself to form successive wraps or convolutions 34, and a thin-walled tubing body 36. The adjacent convolutions or laps 34 of the ribbon 22 heat-bond integrally to one another to form a helical lap joint 38 in the tubing body 36. This lap joint 38 is disposed beneath the plateau portion 28. That is, the lap joint 38 is toward the inside of the tubing body 36 relative to the plateau portion 28.

Further considering FIG. 3, it is seen that the ribbon 22 at its leading edge 24 includes the relatively thicker plateau portion 28 defining plural spaced apart grooves 28*a*. That is, the thick plateau portion 28 may be considered to define plural spaced apart ribs 28*b*. Consideration of the detail seen in FIG. 4 will reveal that the outer two ribs 28*b* are somewhat wider than the center two ribs in this embodiment. That is, the center two ribs 28*b* have a unit width, and the outer two ribs 28*b* preferably have a width of 1½ units. Further, because of its thickness compared to the remainder of the ribbon 22, the plateau portion at the ribs 28*b* and grooves 28*a* is somewhat raised radially outward on the outside of the tubular body 36.

Figure 5:
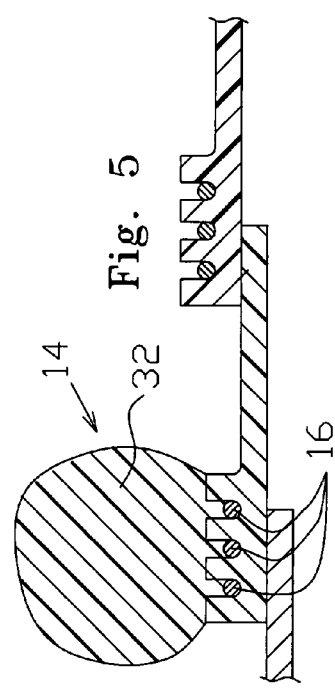
FIG. 5 is a greatly enlarged fragmentary cross sectional view illustrating a subsequent step of manufacture of the tubing according to this invention.

Next, plural conductors (each indicated with the numeral 40) are fed helically about the tubular body 36, one into each of the grooves 28*a* on the plateau 28. And, immediately thereafter, molten bead 32 is applied helically onto the plateau 28 and heat-bonds integrally thereto; capturing the conductors 40 in an integral tubing structure (where they are referenced with the numeral 16). It will be noted viewing FIG. 3 that the bead 32 is not quite yet in place on plateau 28. However, FIG. 5 illustrates the bead 32 in its final position integrally bonding on plateau 28 and defining the outer bead 14 of the finished tubing product 10.

Figure 4:
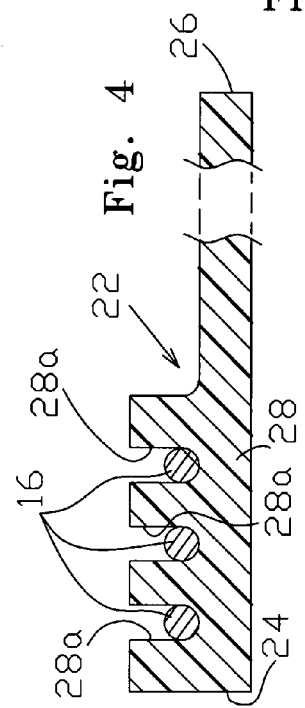
FIG. 4 is a greatly enlarged fragmentary cross sectional view of a portion of the tubing wall seen in FIG. 3 during manufacture.

During and after formation of the tubing 10 as described above, the tubing is subjected to cooling, which may include a conduit disposed within the winding head and which sprays water directed radially outwardly against the inner surface of the tubing 10. Also, to the left of the manufacturing step indicated in FIGS. 3-5 is conventionally disposed a cooling trough containing water into which the tubing enters as it proceeds leftwardly (recalling the motion arrow on FIG. 3). The cooling water cools the tubing product 10 from its molten condition to a finished flexible plastic integral tubular product.

The resulting tubing 10 includes a thin flexible wall section (formed by the ribbon 22 apart from the plateau portion 28) extending between adjacent wraps of the bead 14, as is seen best in FIG. 1. This thin flexible wall portion provides for exceptional flexibility for the tubing 10, while the bead 14 provides support for the wall so that the tubing is collapse-resistant. Also, the conductors 16 are uniformly spaced apart as they extend helically along the tubing within the plateau portion 28 captured by bead 14. This spacing apart of the conductors 16 provides a number of benefits. When a pair of the conductors are employed for electrical resistance heating, the heating is more dispersed than with conventional tubing. Similarly, the electrical properties of the conductors when used to convey electrical signals is favorable to this use. And, telemetry or instrumentation signals (i.e., light or electrical) may be conducted along the conductors 16. Moreover, the spacing apart of these conductors 16 ensures both improved insulation of the conductors from one another, an improved capacitance value between the conductors (and improved uniformity of this capacitance value), and reduced mutual inductive coupling among the conductors.

While an exemplary form or embodiment of the invention has been shown in the drawings and described herein, variations from this exemplary form will be apparent to those skilled in the art. The invention therefore should not be construed as limited to the specific forms shown and described, but instead as is set forth in the following claims, which provide a definition of the invention.

What is claimed is:

1. A thin-walled, flexible and collapse-resistant plastic tubing having a substantially smooth bore and a helical outer support bead, the tubing including plural conductors helically disposed within said wall of the tubing and beneath said support bead, said tubing comprising:
   a flexible tubing wall formed of elongate thermoplastic ribbon having opposite side edges, said thermoplastic ribbon including an elongate fine-dimension portion and a comparatively thickened elongate plateau portion, said plateau portion defining plural elongate fine-dimension grooves, said ribbon while molten being helically wrapped on itself to overlap said opposite side edges a certain amount forming a helical lap joint whereat opposite side edge portions of said ribbon heat-bond integrally to one another so that an elongate tubular body is formed;
   plural elongate conductors each disposed one in a respective one of said fine-dimension grooves of said plateau portion and helically around and along said elongate tubular body; and
   an elongate thermoplastic support bead disposed helically around and along said elongate tubular body atop of both said plateau portion and said conductors, while molten said support bead integrally heat-bonding to said tubing wall to form a unitary thin-walled tubing structure with helical outer support bead and embedded conductors, whereby, said embedded conductors are spaced from one another within said plateau portion, and are insulated from ambient by said support bead.

2. The tubing of claim 1 wherein said plural conductors include at least one resistance conductor for providing resistance heating to said tubing.

3. The tubing of claim 1 wherein said plural conductors include at least one instrumentation conductor for conducting an instrumentation signal along a length of said tubing.

4. The tubing of claim 1 wherein said plural conductors include at least a pair of instrumentation conductors for conducting an instrumentation signal along a length of said tubing, and said instrumentation conductors are spaced apart along their length and helically about said tubing.

5. The tubing of claim 4 wherein a desired capacitance value is maintained between said pair of instrumentation conductors.

6. The tubing of claim 4 wherein a desired low mutual inductance value is maintained between said pair of instrumentation conductors.

7. A method for making a helically wound, seamless plastic tubing comprising the steps of:
   forming an elongate ribbon of molten thermoplastic having opposite side edges and a thickened plateau portion, helically wrapping said elongate ribbon so that said opposite side edges overlap a certain distance to form a helical lap joint and simultaneously heat-bonding said ribbon to itself to form an elongate tubular body with said plateau portion extending radially outwardly on and helically along said tubular body;
   laying an elongate conductor helically around and along said tubular body within said plateau portion;
   forming an elongate bead of thermoplastic material; and
   helically wrapping said bead around and along said tubular body atop said conductor and plateau portion, while simultaneously heat-bonding said bead integrally with said tubular body to form a unitary tubing including said ribbon and said bead with said conductor embedded therein.

8. The method of claim 7 wherein the step of forming said elongate ribbon further includes the step of forming plural elongate grooves extending along said plateau portion, and providing for said elongate grooves to extend helically about and along said tubular body.

9. The method of claim 8 further including the steps of utilizing said plural grooves to define plural ribs on said plateau portion.

10. The method of claim 9 further including the step of providing for said plural ribs to include an outer pair of ribs bracketing the remainder of said plural ribs therebetween, and providing for said remainder of said plural ribs to each define a width of a unity dimension, while also providing for said outer pair of ribs to each define a width of substantially one and one-half times said unity dimension.

11. A smooth-bore flexible tubing with helical outer support bead, said tubing comprising:
   an elongate thermoplastic ribbon helically wrapped and partially overlapped onto itself and mutually heat bonded at side edge portions thereof to form a flexible tubing wall, said thermoplastic ribbon including an elongate fine-dimension portion and a comparatively thickened elongate plateau portion extending radially outwardly and helically along said flexible tubing;
   plural elongate conductors disposed helically about and along said flexible tubing at said plateau portion; and
   an elongate thermoplastic support bead disposed helically around and along said elongate tubing atop of both said plateau portion and said conductors, said support bead integrally heat-bonding to said tubing wall to form a unitary thin-walled tubing structure with helical outer support bead and embedded conductors, whereby, said embedded conductors are spaced from one another within said plateau portion.

12. The tubing of claim 11 wherein said plural conductors include at least one resistance conductor for providing resistance heating to said tubing.

13. The tubing of claim 12 wherein said plural conductors include a pair of electrically connected resistance conductors for providing resistance heating to said tubing.

14. The tubing of claim 11 wherein said plural conductors include at least one instrumentation conductor for conducting an instrumentation signal along a length of said tubing.

15. The tubing of claim 11 wherein said plural conductors include at least a pair of instrumentation conductors for conducting an instrumentation signal along a length of said tubing, and said pair of instrumentation conductors are spaced uniformly apart along their length and helically about said tubing.

16. The tubing of claim 15 wherein a desired capacitance value is maintained between said pair of instrumentation conductors.

17. The tubing of claim 15 wherein a desired low mutual inductance value is maintained between said pair of instrumentation conductors.

* * * * *